United States Patent [19]

McRae

[11] 4,112,204

[45] Sep. 5, 1978

[54] BATTERY TERMINAL SEAL STRUCTURE

[75] Inventor: Russell C. McRae, Los Altos, Calif.

[73] Assignee: ILC Technology, Inc., Sunnyvale, Calif.

[21] Appl. No.: 770,300

[22] Filed: Feb. 22, 1977

[51] Int. Cl.$^2$ .......................................... H01M 2/30
[52] U.S. Cl. ................................. 429/181; 174/50.61; 361/433
[58] Field of Search ............... 429/174, 185, 104, 171, 429/184, 181; 361/433; 174/50.61

[56] References Cited

U.S. PATENT DOCUMENTS

| | | | |
|---|---|---|---|
| 3,005,865 | 10/1961 | Jonsson | 174/50.61 |
| 3,009,012 | 11/1961 | Polese | 174/50.61 |
| 3,416,964 | 12/1968 | Michalko | 429/174 |
| 3,840,408 | 10/1974 | Bondley | 429/181 |

*Primary Examiner*—Donald L. Walton
*Attorney, Agent, or Firm*—Phillips, Moore, Weissenberger, Lempio & Majestic

[57] ABSTRACT

An electrical terminal having an insulating seal structure is disclosed which terminal is particularly adapted for use in high energy batteries. The fabrication of the seal structure by sealing two metallic members between two annular ceramic members is described. Design considerations are disclosed which enable the seal structure to be simply and inexpensively fabricated and yet withstand adverse environmental and mechanical conditions.

8 Claims, 5 Drawing Figures

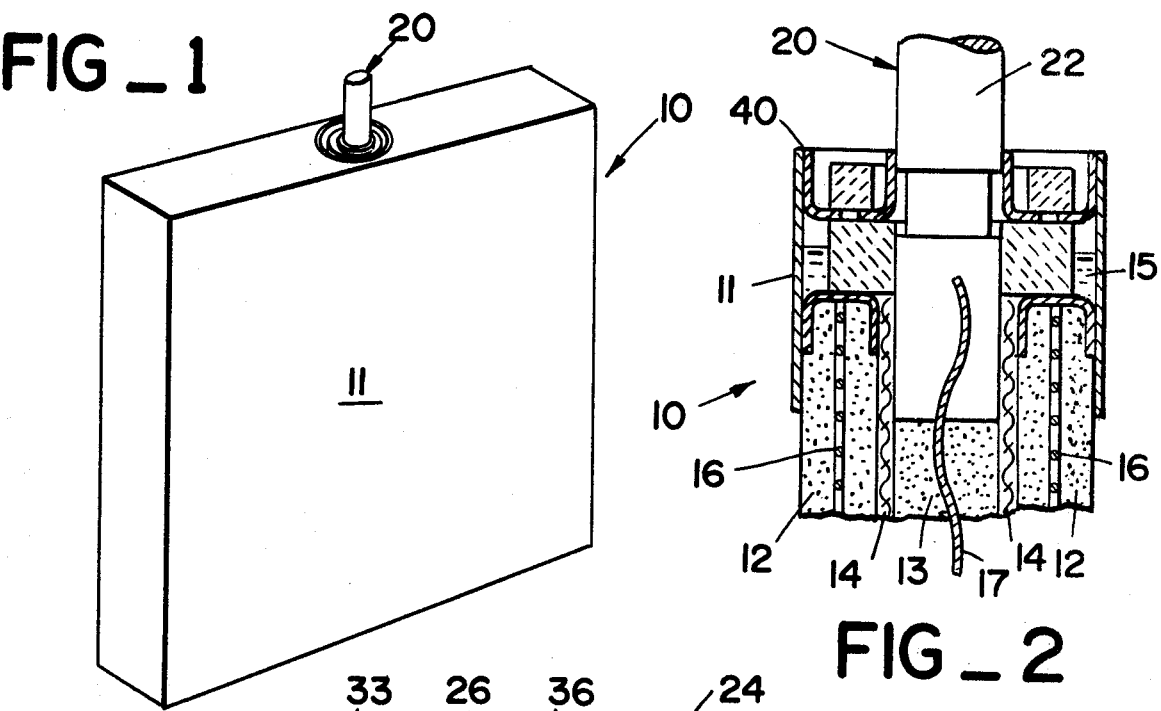
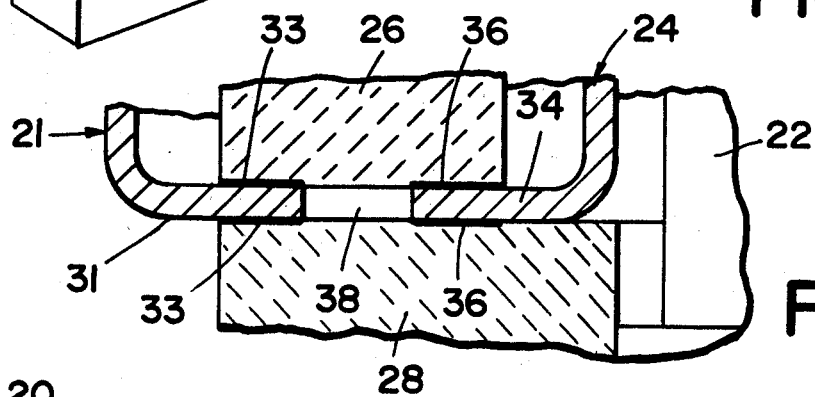
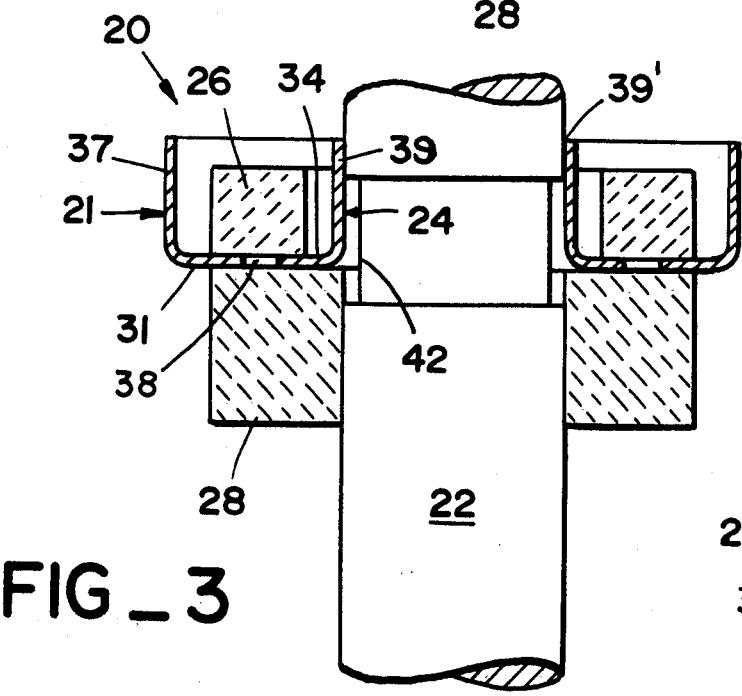
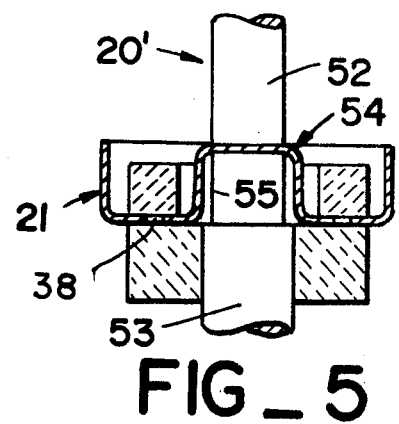

BATTERY TERMINAL SEAL STRUCTURE

BACKGROUND OF THE INVENTION

This invention relates to insulating seal structures for low voltage, low frequency but high current electrical devices and more particularly to an insulating seal structure for the electrical terminals of high energy batteries.

The pressure of the ever increasing energy demands of society has required a continuing search for new and unconventional sources of energy and a continuing effort to make improvements in the more conventional sources of energy. Thus, a wide variety of sources of high voltages and/or high frequency electrical power have been developed.

More recently, there has been renewed interest in the development and improvement of low frequency, low voltage power sources such as batteries. As a result, a number of novel electrochemical batteries have been proposed based on the use of uncommon, if not exotic, chemical reactions. Among such batteries are those based on lithium-sulfur and sodium-sulfur reactions which are capable of producing higher electrical energy outputs than more conventional batteries.

Because of their high energy output, serious consideration is being given to the use of such batteries to power vehicles or to store electrical power during periods of low energy requirements for subsequent use in satisfying high energy requirements. Such batteries are essentially direct current devices and operate at low voltages, usually less than about 10 volts, but are capable of operating at thousands of ampere-hours with energy outputs of many kilowatt hours.

Electrical terminal structures designed for use in conventional batteries are not capable of handling the electrical energy and powers involved. This, coupled with the unusual chemical reactions involved have heretofore resulted in the design of expensive and complicated seal structures for the electrical terminals of the high energy batteries.

Similarly, seal structures designed for use in high voltage, high frequency electrical devices would tend to be over designed and thus too expensive for use in high energy batteries even if capable of handling the high currents involved. In addition, the unusual chemical and mechanical environment of high energy batteries is unsuited for high voltage, high frequency seal structures of the prior art.

It is the principal object of this invention to provide a seal structure for the electrical terminals of high energy, low voltage and low frequency devices which is simple and inexpensive to fabricate and yet is highly reliable under adverse environmental and mechanical conditions.

SUMMARY OF THE INVENTION

Briefly, this invention provides a high electrical energy terminal for a low voltage, low frequency electrical device. The structure includes a first metallic sealing member having a first portion defining an annulus of given internal and external diameters and opposite parallel surfaces with a second portion defining a right circular cylinder at the external periphery thereof and a second metallic sealing member having a first portion defining an annulus with opposite parallel surfaces having a given internal and a given external diameter smaller than the given internal diameter of the annulus defined by the first portion of the first metallic sealing member with a second portion defining a right circular cylinder at the internal periphery thereof. The structure also includes first and second annular ceramic members each having external diameters larger than the given internal diameter of the annulus defined by the first metallic sealing member and internal diameters smaller than the given external diameter of the annulus defined by the second metallic sealing member. Ceramic to metal seals bond each of the opposite parallel surfaces of the annulus defined by the first metallic sealing member to a different one of the first and second annular ceramic members and ceramic to metal seals bond each of the opposite parallel surfaces of the annulus defined by the second metallic sealing member to a different one of the first and second annular ceramic members with the second annulus in coaxial relation to the first annulus whereby the internal and external diameters thereof are spaced from each other between the first and second annular ceramic members.

The first annular ceramic cylinder has an internal diameter larger than the right circular cylinder defined by the second portion of the second metallic member and is received thereabout in radially spaced relation thereto. A solid metallic rod is received within the right circular cylinder defined by the second portion of the second metallic member and hermetically bonded thereto. The second annular ceramic member has an internal diameter dimensioned to receive the solid metallic rod with a small tolerance.

BRIEF DESCRIPTION OF THE DRAWING

The foregoing and other objects and features of this invention will be more fully understood from a reading of the following detailed description of a preferred embodiment thereof in conjunction with the attached drawings wherein:

FIG. 1 is a perspective view of a high energy battery having an output terminal including the seal structure of this invention.

FIG. 2 is an enlarged fragmentary cross-sectional view of the output terminal of the battery of FIG. 1 showing the seal structure according to this invention as mounted in the battery.

FIG. 3 is an enlarged, partially cross-sectional view of the terminal and seal structure portion only of FIG. 2.

FIG. 4 is a further enlarged cross-sectional view of a portion of the seal structure of FIG. 3; and FIG. 5 is a reduced cross-sectional view similar to FIG. 3, showing an alternate embodiment of the terminal and seal structure according to this invention.

DETAILED DESCRIPTION OF PREFERRED EMBODIMENTS

Referring to FIG. 1, a perspective view of a high energy lithium-sulfur battery, known in the art, is shown by way of example. As shown in FIG. 1, the battery 10 includes an output terminal 20 embodying the seal structure of this invention.

Referring to FIG. 2, an enlarged cross-sectional view of the battery 10, taken through the output terminal 20, is shown. The internal structure of the battery 10 is somewhat simplified for ease of understanding. Basically, the battery 10 comprises a stainless steel shell 11, or can, defining a hollow rectangular volume having opposed major surfaces. A pair of negative electrode plates or plaques 12 are mounted within the rectangular volume in contact with the opposed major surfaces of the shell 11. A single positive electrode plate or plaque 13 is centrally disposed within the shell 11 in parallel relation to the negative plates 12. The positive plate 13 is insulated from the negative plates 12 by insulating layers 14 which may comprise a cloth or fabric of insulating material which is permeated by an appropriate liquid electrolyte.

For example, the negative plate may be made of compacted iron sulfide powder with a stainless steel current collecting screen 16 embedded therein. The positive plate or plaque 13 may be made of compacted lithium aluminum with an appropriate metallic electrode 17 embedded therein. The insulating layers 14 may be made of layers of zirconium oxide cloth or a boron nitride fabric or both. An excess of an electrolyte 15 is provided so that the layers 14 will always be permeated to provide the desired chemical battery action. For example, the electrolyte 15 may be a lithium chloride-potassium chloride eutectic salt which is liquid at the 400° C operating temperature of the battery 10.

According to this invention, the output terminal 20 includes a heavy metallic lead or pin 22 made of a metal which is not chemically attacked by the electrolyte 15. For example, the lead 22 may be made of tungsten, molybdenum, nickel or iron. Similarly, the electrode 17 embedded in the positive plate 13 may be made of stainless steel, molybdenum or iron and the lead 22 is preferably embedded in the positive plate 13 and electrically connected to the electrode 17.

The lead 22 of the terminal 20 must be electrically insulated from the shell 11 of the battery 10 and yet the lead 22 must be rigidly fixed to the shell 11 by a rugged mechanical mount. Furthermore, the mounting of the lead 22 of the terminal 20 must provide a hermetic seal which will avoid leakage of the electrolyte 15 from the shell 11. Finally, the terminal structure 20 and shell 11 of the battery 10 will be subjected to high temperature differentials during operation and thus the parts thereof must be adapted to accommodate differential thermal expansion produced by temperature gradients therein and the different thermal expansion characteristics of the materials involved.

As best shown in FIG. 3, the seal structure according to this invention comprises a first metallic sealing member 21 having a portion 31 defining a first annulus of given internal diameter and opposite parallel surfaces and a second metallic sealing member 24 having a portion 34 defining a second annulus with opposite parallel surfaces of given external diameter smaller than the given internal diameter of the first annulus 31 defined by the first metallic sealing member 21. The seal structure 20 also includes a first annular ceramic member 26 and a second annular ceramic member 28. The annular ceramic members 26 and 28 each have external diameters larger than the internal diameters of the first annulus 31 and internal diameters smaller than the external diameter of the second annulus 34.

Referring to FIG. 4, the opposite parallel surfaces of the first annulus 31 are each bonded to a different one of the annular ceramic members 26 and 28 by means of a hermetic ceramic to metal seal 33. Similarly, the opposite parallel surfaces of the second annulus 34 are each bonded to a different one of the annular ceramic members 26 and 28 by a hermetic ceramic to metal seal 36 with the second annulus 34 in coaxial relation to the first annulus 31. Thus, according to this invention, a vacuum tight annular void 38 is provided which separates the first and second annuluses 31 and 34 between the first and second annular ceramic members 26 and 28. Such annular vacuum tight void insures low voltage insulation between the metallic sealing members 21 and 24 under all environmental conditions.

According to this invention, the first annulus 31 and the second annulus 34 are relatively thin and thus may be made of a metal which need not have a thermal expansion coefficient closely approximating the thermal expansion coefficient of the annular ceramic members 26 and 28. Instead the bonding of the ceramic members 26 and 28 to the opposite parallel surfaces of the first annulus 31 and second annulus 34 will enable the annular ceramic members 26 and 28 to dominate the structure and insure the integrity of the seals. Thus the metallic sealing members 21 and 24 may be made of any appropriate metal such as nickel, for example, to which the ceramic members 26 and 28 may be bonded by known ceramic to metal sealing techniques and which are capable of withstanding the environment to which the battery 10 is exposed. For example, the ceramic members 26 and 28 may be made of high alumina ceramic and the ceramic to metal seals 33 and 36 may be active alloy brazes.

Referring again to FIG. 3, it will be seen that the metallic sealing members 21 and 24 are preferably made of relatively thin metal and provided with flanges 37 and 39 each extending generally transversely of the parallel surfaces of the annulus 31,34 thereof. The flange 39 of the metallic sealing member 24 is adapted to closely surround the lead 22 of the terminal structure and is bonded thereto at 39' as by conventional brazing or welding techniques. Similarly, referring to FIG. 2, the flange 37 of the sealing member 21 is adapted to fit within a hole provided in the shell 11 of the battery 10 and is bonded thereto at 40 by tungsten inert gas welding, for example.

The flanges 37 and 39 have sufficient length to relieve differential thermal expansion between the materials involved. As best shown in FIG. 3, the lead 22 may be slightly upset as indicated at 42 in order to provide space for the flexing of the flange 38 of the metallic sealing member 24. The inner and outer diameters of the annular ceramic members 26 and 28 should also be selected to allow for the flexing of the flanges 37 and 39 of the metallic sealing members 21 and 24.

As shown in FIG. 3, the flanges 37 and 39 of the sealing members 21 and 24 may both extend in the same direction and the inner and outer diameters of the annular ceramic member 26 are selected to allow appropriate flexure thereof. The inner diameter of the annular ceramic member 28 is selected to receive the lead 22 with a close fit having only sufficient tolerance to allow for differential thermal expansion between the lead 22 and the annular ceramic member 28. Thus, migration of electrolyte into and out of the volume defined by the upset portion 42 of the lead 22 is minimized. In addition, the mechanical relationship between the internal diameter of the annular ceramic member 28 and the external diameter of the lead 22 provides additional mechanical strength and ruggedness in the terminal structure 10.

The ceramic to metal seal 33 between the annulus 31 and the annular ceramic member 28 may be plated to protect it against attack by the electrolyte 15. The limitation on migration of the electrolyte 15 into the volume defined by the upset portion 42 of the lead 22 by the annular ceramic member 28 will tend to protect the seal 36 between the annulus 34 and the annular ceramic member 28 from attack by the electrolyte. According to this invention, the dimension of the void 38 between the external periphery of the annulus 34 and the internal periphery of the annulus 31 should be as small as practical but not less than about 50 mils in order to provide adequate insulation between the metallic sealing members 21 and 24. It has been found that the radial length of the ceramic to metal seals 33 and 36 must be at least about 25 mils in order to insure an adequate hermetic seal. Thus, the annular ceramic members 26 and 28 must be dimensioned to have surfaces overlapping each other by at least about 100 mils according to the teaching of this invention.

Referring to FIG. 5, an alternate embodiment 20' of the terminal structure according to the teaching of this invention is shown in which the lead is divided transversely of its axis into an external portion 52 and an internal portion 53. In this embodiment, the first sealing member 21 may be identical to that described hereinabove but the second sealing member 54 is made in the form of a cup with the ends of the external portion 52 and the internal portion 53 of the lead butt welded to the bottom of the cup on opposite sides thereof. According to this embodiment of the invention, the internal portion 53 of the lead may be made of tungsten and the external portion 52 of the lead may be made of nickel, for example. The sealing members 21 and 54 may be made of nickel having a thickness of 10 to 30 thousandths, for example. The end of the internal portion 53 of the lead may be upset adjacent the bottom of the cup as indicated at 55 and the remainder of the seal structure according to this embodiment of the invention may be identical to that described hereinabove.

Thus, it will be seen that many obvious modifications may be made in adapting the seal structure of this invention for use in specific battery structures. The dimensions of the various parts may be selected to suit the dimensions of the battery and accommodate the various thermal chemical and mechanical environmental conditions involved. The metallic sealing members 21 and 24 are preferably made of the same thickness material and thus the seal structure according to the teaching of this invention may be easily and inexpensively fabricated since only the opposed surfaces of the annular ceramic members 26 and 28 are dimensionally critical. Such surfaces may be easily ground and lapped to insure flatness and parallelism thereof although more expensive and intricate shapes would be possible.

In an embodiment similar to FIG. 3, of this invention as actually built, the lead 22 is made of tungsten rod 2 inches (5 cm) long and 0.375 inch (1 cm) in diameter. The sealing members 21 and 24 are made of nickel and have a thickness of 0.015 inch (0.04 cm).

The ceramic members 26 and 28 are made of high alumina ceramic having an external diameter of 0.815 inch (2 cm). The first ceramic member 26 has an internal diameter of about 0.455 inch (1.2 cm) and a thickness of about 0.150 inch (0.4 cm). The second ceramic member 28 has a thickness of about 0.250 inch (0.6 cm) and an internal diameter dimensioned to receive the lead 22 in accordance with the teaching of this invention.

The ceramic to metal seals 33 and 36 are zirconium-nickel active metal brazes having a length of about 0.040 inch (1 cm). Similarly, the void 38 has a length between the peripheries of the sealing members 21 and 24 of about 0.040 inch (1 cm).

It has been found that if the length of the void 38 between the peripheries of the sealing members 21 and 24 is made greater than about 500 mils (1.25 cm), mechanical considerations will tend to add to the expanse of fabricating the seal structure. Since the voltages which the seal structure of this invention is intended to withstand do not exceed about 10 volts, a structure having a void 38 with a length greater than about 500 mils would tend to be economically impractical and without technical advantage.

It has been found that terminal structures 20 including seal structures according to the teaching of this invention are rugged and capable of withstanding the environmental conditions to which high energy batteries, for example, are exposed. The terminal structures may be made using inexpensive and conveniently available metallic and ceramic members and the production techniques, including active metal ceramic to metal sealing techniques, are well known and well established in the art. Thus, the subject matter for which protection is sought is defined in the following claims.

What is claimed is:

1. In a high electrical energy low voltage battery comprising a sealed metallic can containing positive and negative electrodes and an electrical terminal hermetically sealed through said can and electrically connected to one of said electrodes the improvement wherein said electrical terminal comprises:
   (a) a first metallic sealing member having a first portion defining an annulus of given internal diameter, given external diameter and opposite substantially parallel surfaces and a second portion defining a right circular cylinder at the external periphery of said annulus defined by said first portion of said first metallic sealing member;
   (b) a second metallic sealing member having a first portion defining an annulus with opposite parallel surfaces having a given internal diameter and a given external diameter smaller than said given internal diameter of said annulus defined by said first portion of said first metallic sealing member and a second portion defining a right circular cylinder at the internal periphery thereof;
   (c) a first annular ceramic member having an internal diameter smaller than said given external diameter and larger than said given internal diameter of said annulus defined by said first portion of said second metallic sealing member and an external diameter larger than said given internal diameter of said annulus defined by said first portion of said first metallic sealing member;
   (d) a second annular ceramic member having an internal diameter smaller than said given internal and external diameters of said annulus defined by said first portion of said second metallic sealing member and an external diameter larger than said given internal diameter of said annulus defined by said first portion of said first metallic sealing member;
   (e) ceramic of metal seals bonding each of said opposite parallel surfaces of said annulus defined by said first portion of said first metallic sealing member to a different one of said first and second annular ceramic members;
   (f) ceramic to metal seals bonding each of said opposite parallel surfaces of said annulus defined by said first portion of said second metallic sealing member to a different one of said first and second annular ceramic members with said first annular ceramic member surrounding said right circular cylinder defined at the internal periphery of said second metallic sealing member in radially spaced relation thereto and with said annulus defined by said first portion of said second metallic sealing member in coaxial relation to said annulus defined by said first portion of said first metallic sealing member whereby said external and internal diameters respectively thereof are spaced from each other between said first and second annular ceramic members; and (g) a solid metallic rod received with said right circular cylinder defined by said second portion of said second metallic sealing member and hermetically bonded thereto, said internal diameter of said second annular ceramic member being dimensioned to receive said solid metallic rod with a small tolerance.

2. The improvement as claimed in claim 1 wherein said given external diameter of said second metallic sealing member is at least about 50 mils but not more than about 500 mils smaller than said given internal diameter of said first metallic sealing member.

3. The improvement as claimed in claim 2 wherein said first and second metallic sealing members have equal thicknesses between said opposite substantially parallel surfaces of said first annulus and second annulus, respectively, defined thereby.

4. The improvement as claimed in claim 3 wherein said first and second annular ceramic members have opposed surfaces which are substantially parallel to each other and which opposed surfaces are each bonded to a different one of said opposite substantially parallel surfaces of both said first annulus and said second annulus.

5. The improvement as claimed in claim 4 wherein said equal thickness between said opposite substantially parallel surfaces of said first annulus and said second annulus is at least about 10 mils but not more than about 30 mils.

6. The improvement as claimed in claim 5 wherein said ceramic to metal seals are active metal brazes.

7. The improvement as claimed in claim 6 wherein said first and second metallic sealing members are made of nickel, said first and second annular ceramic members are made of high alumina ceramic and said ceramic to metal seals are zirconium nickel active metal brazes.

8. The improvement as claimed in claim 1 wherein said right circular cylinders formed by said first and second metallic sealing members both extend in the same direction to surround said first annular ceramic member in radially spaced relation thereto.

* * * * *

UNITED STATES PATENT OFFICE
CERTIFICATE OF CORRECTION

Patent No. 4,112,204      Dated September 5, 1978

Inventor(s) RUSSELL C. McRAE

It is certified that error appears in the above-identified patent and that said Letters Patent are hereby corrected as shown below:

Column 6, line 57 — Delete "of" (first occurrence) and substitute --to-- therefor.

Column 7, line 11 — Delete "with" and substitute --within-- therefor.

Signed and Sealed this

Eighth Day of May 1979

[SEAL]

Attest:

RUTH C. MASON
*Attesting Officer*

DONALD W. BANNER
*Commissioner of Patents and Trademarks*